(12) United States Patent
West et al.

(10) Patent No.: US 8,916,760 B1
(45) Date of Patent: Dec. 23, 2014

(54) MUSIC NOTATION SYSTEM

(71) Applicants: Blake West, Austin, TX (US); Michael Sall, San Francisco, CA (US)

(72) Inventors: Blake West, Austin, TX (US); Michael Sall, San Francisco, CA (US)

( * ) Notice: Subject to any disclaimer, the term of this patent is extended or adjusted under 35 U.S.C. 154(b) by 0 days.

(21) Appl. No.: 13/957,409

(22) Filed: Aug. 1, 2013

(51) Int. Cl.
*G09B 15/02* (2006.01)
(52) U.S. Cl.
CPC ........................... *G09B 15/02* (2013.01)
USPC ........................................... 84/483.2
(58) Field of Classification Search
CPC .......... G09B 15/02; G09B 5/06; G09B 15/06; G09B 15/001; G09B 19/00; G09B 15/08; G09B 17/04; G09B 17/00; G10G 1/00; G10G 1/02; H04N 1/00795
USPC ................. 84/470 R, 483.1, 483.2
See application file for complete search history.

(56) References Cited

U.S. PATENT DOCUMENTS

| | | | | |
|---|---|---|---|---|
| 3,994,500 A | * | 11/1976 | Schow | 273/243 |
| 2009/0173212 A1 | * | 7/2009 | Wold | 84/483.2 |
| 2012/0036980 A1 | * | 2/2012 | Antaki | 84/483.2 |

* cited by examiner

*Primary Examiner* — Kimberly Lockett

(57) ABSTRACT

An improved music notation system is disclosed. Each pitch has a discrete, highly memorable symbol and corresponding mnemonic, while still having a spatial component and mapping onto the same spot as the standard system. Thus the shape of a melody can be quickly discerned, while individual pitches can also be quickly recognized without having to learn the treble and bass clef separately. Each rhythmic symbol is also unique and most are horizontal, and so now reflect how long you hold each note, thus creating a spatial component where there was none before. This makes for each rhythmic symbol to be much more intuitive and easier to learn and understand. We've also changed minor rules that empirically give trouble to beginning learners, such as placement of sharps and flats, and the ties/dots system has also been improved.

4 Claims, 9 Drawing Sheets

Standard Notation                    New Notation sharp               51 sharp    
flat                52 flat                 50
natural             53 natural non-sharp           non-sharp   
non-flat            non-flat

FIG. 8

MUSIC NOTATION SYSTEM

BACKGROUND

Music notation is the written expression of music that associates the pitches, rhythms, harmonies, articulation, and other attributes of music into a musical score, commonly referred to as sheet music. The musical score is often organized into pages, systems, staffs, and bars/measures.

Learning to read standard music notation can take years to become proficient, and is generally considered to be rather difficult. Yet millions attempt to learn it every year, because it is highly valuable if a degree of mastery can be attained. Thus, an easier way to read music would be very helpful.

Most systems employ no pitch symbols at all, making recognition rely solely on spatial relationships. This requires either tedious counting of lines and spaces, or using 4 non-intuitive mnemonics to attempt to help. Empirically though, these mnemonics can actually be confusing to a learner as they might employ the wrong one in the wrong situation. Some other systems employ inferior pitch symbols that are either unattractive or not intuitively designed. Most, if not all other notation systems, employ less intuitive rhythmic symbols that rely solely on symbol recognition and contain no spatial component.

SUMMARY

In an improved notation system, each pitch has a discrete, highly memorable symbol that has been carefully designed to work with a particular mnemonic, thus aiding quick learning. Further, each pitch still has a spatial component by mapping onto the same place on the staff as the old system. Thus the shape of a melody can be quickly discerned, while individual pitches can also be quickly recognized. Each rhythmic symbol is also unique and most are horizontal, and so now reflect how long you hold each note, thus creating a spatial component where there was none before. This makes for each rhythmic symbol to be much more intuitive and easier to learn and understand.

Minor rules that empirically give trouble to young learners have been modified, such as placement of sharps and flats, and the ties/dots system has also been improved.

The system has 6 main components:
1. Unique symbols for each pitch A, B, C, D, E, F, G, respectively
2. Unique symbols for each rhythm class (whole note, half, quarter, eighth, 16th, 32nd, 64th, etc.). Whole, half and quarter all use horizontal lines of proportional length
3. A "notch" system that allows for any two types of rhythms to be connected, thus allowing for any length note to be created.
4. Corresponding rest symbols for each rhythm class.
5. Two unique symbols for showing sharp and flat
6. A set of mnemonics for each pitch symbol designed to be easily understood and immediately remembered.

Each of these components work together to notate any given piece of music in a simpler, easier to read fashion.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTION OF DRAWINGS

The novel features believed characteristic of the presently disclosed subject matter will be set forth in any claims that are filed later. The presently disclosed subject matter itself, however, as well as a preferred mode of use, further objectives, and advantages thereof, will best be understood by reference to the following detailed description of an illustrative embodiment when read in conjunction with the accompanying drawings, wherein:

FIG. 2 shows an exemplary embodiment of the present disclosure illustrating the symbols for each rhythm class whole note through 32nd note as compared with the symbols in standard notation.

FIG. 4 shows an exemplary embodiment of the present disclosure illustrating the "rest" symbols for each rhythm class whole through 32nd note, and their standard notation equivalent.

FIG. 8 shows an exemplary embodiment of the present disclosure illustrating a translation of an excerpt of music from the standard notation into the new notation of the present disclosure.

DETAILED DESCRIPTION OF THE SPECIFIC EMBODIMENTS

Although described with particular reference to musical notation, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

Learning to read standard music notation can take years to become proficient, and it is generally considered to be rather difficult. Yet millions attempt to learn it every year, because it is highly valuable if a degree of mastery can be attained. Thus, an easier way to read music would be very helpful. The present disclosure solves this problem.

Standard musical notation uses only spatial recognition for pitch, and only symbols for rhythms. In contrast, the musical notation system of the present disclosure employs both spatial and symbol recognition for both rhythm and pitch when reading music. Therefore, the musical notation system of the present disclosure utilizes symbols that are more intuitive than standard notation to the user. Further, the pitch symbols of the present disclosure are associated with memorable mnemonics. Additionally, the rhythmic symbols of the present disclosure reflect how long a note is intended to be held by their horizontal length. All of the above features significantly reduce the barriers to learning to read music.

Figure 1:
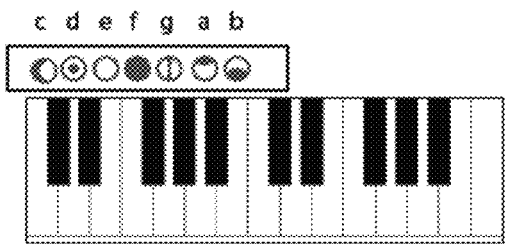
FIG. 1 shows an exemplary embodiment of the present disclosure illustrating the symbols used in the new notation for each pitch class A, B, C, D, E, F, G, respectively, as compared with standard notation for the same pitches.
Figure 1:
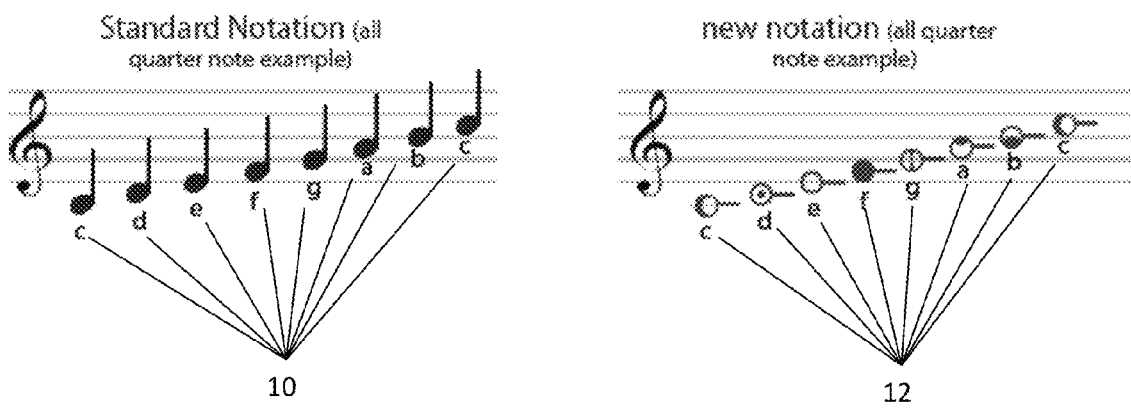

FIG. 1 shows an exemplary embodiment of the present disclosure illustrating the symbols used in the musical notation system of the present disclosure for each pitch class A, B, C, D, E, F, G, respectively, as compared with standard notation for the same pitches. Most previous systems only employ a spatial method to recognize pitch. Each standard notation pitch 10 is displayed using the same symbol. That is, the user is only able to determine a pitch of a note relative to some fixed point. For example, a standard staff is displayed comprising a set of five horizontal lines and four spaces that each represents a different musical pitch. The user must count lines and spaces to identify the exact position of a note placed on the staff, and thus determine the pitch of the note.

Pitch recognition in previous systems is very difficult to learn because it relies on spatial recognition, and spatially recognizing notes is empirically more difficult than symbol recognition. Additionally, it means that different clefs necessarily have different note patterns, thus requiring additional effort to learn two different spatial configurations. With pitch symbols, such duplication of effort becomes unnecessary.

The pitch symbols 12 in the musical notation system of the present disclosure are also displayed on the standard staff as pitch spatial components. However, the pitch symbols are further displayed with pitch symbol components that use distinctive symbols for each pitch to make recognition much quicker for the use. Each pitch of a note in the present disclosure has a discrete, highly memorable pitch symbol 12, while retaining a spatial component and mapping onto the same lines and spaces of the previous notation systems. Thus, the shape of a melody can be quickly discerned, while individual pitches can also be quickly recognized. This also makes it so that anyone well versed in the old system should have very little trouble reading the new system.

Figure 2:
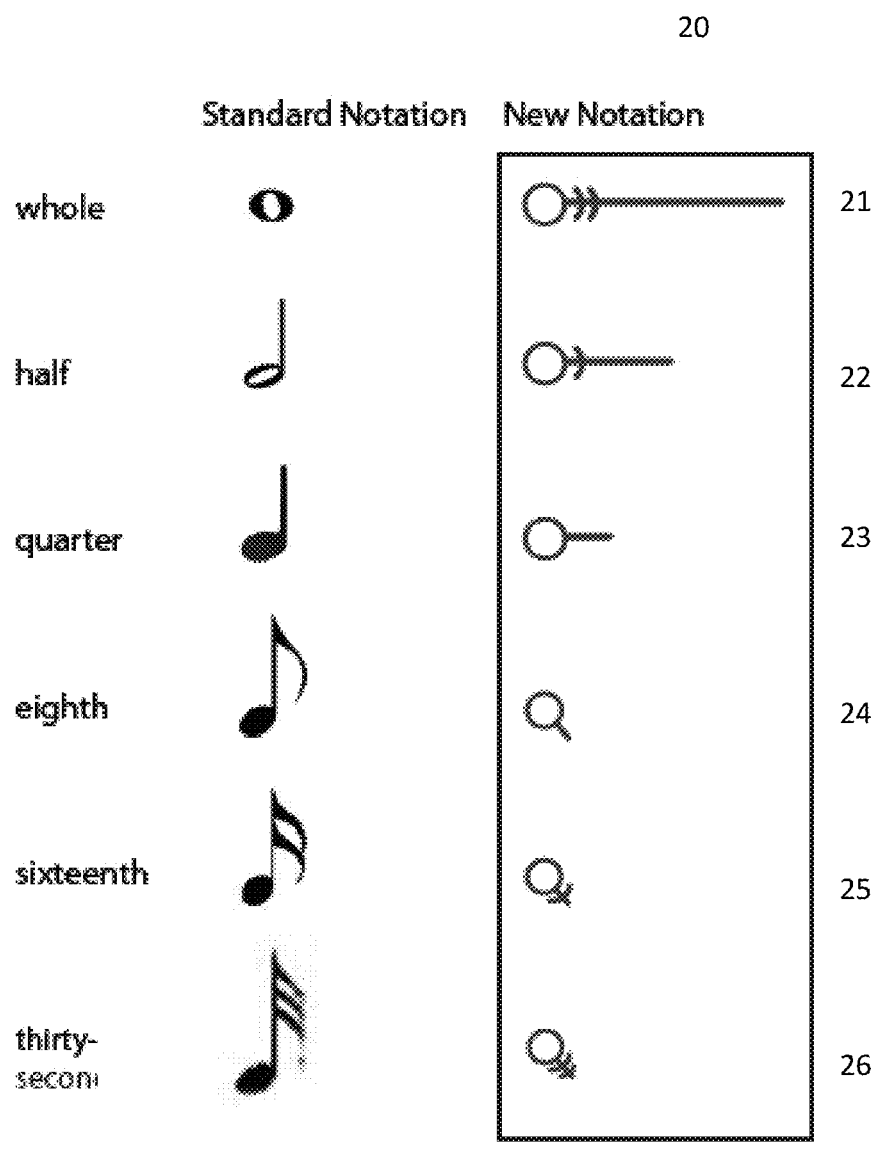

The symbols that exist for rhythm in previous system are not intuitive because they are arbitrary and bear no relationship with the action being performed. FIG. 2 shows an exemplary embodiment of the present disclosure illustrating the symbols for each rhythm class, whole note through 32nd note, and compares those with the symbols in standard notation. Each of the rhythm symbols 20 in the musical notation system of the present disclosure is distinct from the other symbols, and further reflects how long each note is intended to be held. By associating a rhythm spatial component with each rhythm symbol 20 where there was none before, each rhythm symbol 20 becomes more intuitive and easier to learn and understand.

The system presently disclosed contains new unique rhythm symbols for whole, half, and quarter notes that are horizontal instead of the standard vertical flag. Eighth notes, sixteenth notes, and thirty-second notes have also been changed. For example, a whole note 21 may be presented as a circle connected to a full-length horizontal line, the full-length horizontal line intersected by two curves. A half note 22 may be presented as a half-length horizontal line, the half-length horizontal line intersected by one curve. Intuitively, this indicates to the user that the half note 22 is intended to be held for half the duration as whole note 21. Similarly, the quarter note 23 may be presented as a circle connected to a quarter-length horizontal line to indicate to the user that the quarter note 23 is intended to be held for one-fourth of the duration as whole note 21. The eighth note 24, sixteenth note 25 and thirty-second note 26 are presented with one, two, and three curves connected to a circle, respectively.

Figure 3:
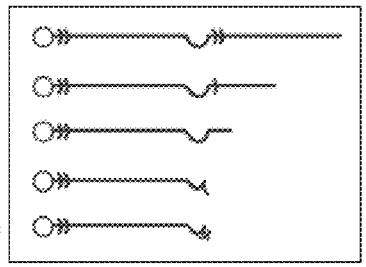
FIG. 3 shows an exemplary embodiment of the present disclosure illustrating a "notch" system to connect differing rhythmic values in the new notation system. This replaces "ties" and "dots" from the standard notation.

FIG. 3 shows an exemplary embodiment of the present disclosure illustrating a notch system to connect differing rhythmic values in the musical notation system of the present disclosure. This replaces "ties" and "dots" from previous notation systems. Ties 31 and dots 32 in the previous notation systems typically cause confusion.

Ties 31 are confusing because the user actually sees two different notes, and yet the user is only supposed to play one. Dots 32 in previous notation systems are confusing because they add different lengths of time to different notes. A dotted half-note equals a half-note plus one beat; whereas a dotted quarter-note equals a quarter note plus half of a beat. The rule is adding 50% of the notes value, but this can be confusing.

Should a note need to be elongated, or if its length is in-between beat values, such as 1.5 beats, the note may be elongated through the notch connecting system. Under the presently disclosed musical notation system, if a half-note is "tied" to another half-note, it is presented as a notched symbol 33, wherein a half-note symbol is notched to another half-note symbol. Thus, the notched symbol 33 is presented as one long note, rather than two separate notes. So instead of having ties or dots, the presently disclosed notch system, as seen in FIG. 3, to convey any elongated rhythms in a more literal and intuitive fashion.

Figure 4:
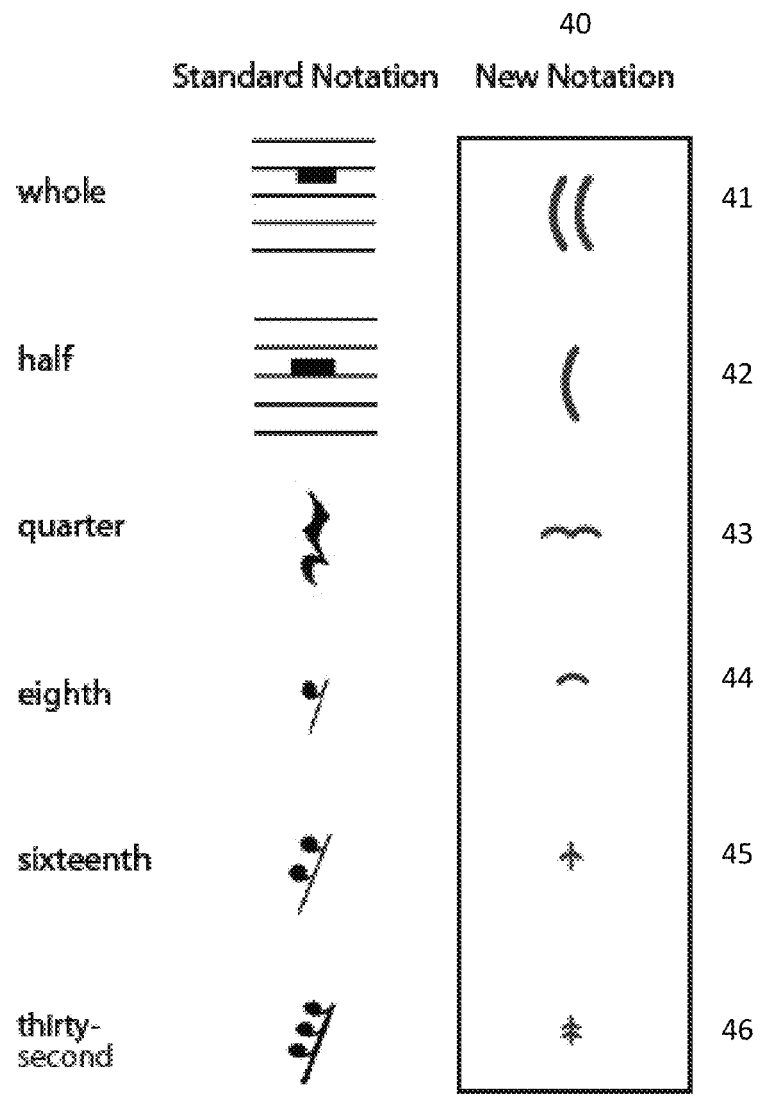

FIG. 4 shows an exemplary embodiment of the present disclosure illustrating the rest symbols 40 for each rhythm class whole through 32nd note, and their standard notation equivalent. A whole rest 41 is presented as two vertically oriented curves. A half rest 42 is presented as one vertically oriented curve. Intuitively, this indicates to the user that the half rest 42 is intended to be held for half the duration as whole rest 41. A quarter rest 43 is presented as two horizontally oriented curves. An eighth rest 44 is presented as one horizontally oriented curve. Intuitively, this indicates to the user that the eighth rest 44 is intended to be held for half the duration as the quarter rest 43. The sixteenth rest 45 and thirty-second rest 46 are presented as having increasingly smaller curves.

Figure 5:
FIG. 5 shows an exemplary embodiment of the present disclosure illustrating the new sharp and flat symbols, and compares that with the standard notation equivalents.
Figure 5:
Figure 5:
Figure 5:
Figure 5:
Figure 5:
Figure 5:
Figure 5:
Figure 5:
Figure 5:

The musical notation system of the present disclosure also changes minor rules that empirically give trouble to young learners, such as placement of sharps and flats. FIG. 5 shows an exemplary embodiment of the present disclosure illustrating the new sharp and flat symbols, and compares that with the standard notation equivalents. Previous notation systems have the sharp or flat designation located beside the note, and unconnected, leaving learners unsure which note is sharp or flat. Sharps and flats are indicated as presently disclosed as pitch modifiers 50 connected directly to their target note. Further, sharp symbol for a sharp pitch modifier 51 points upwards, and the flat symbol for a flat pitch modifier points downwards, which more intuitively conveys the meaning. The sharp pitch modifier 51 indicates to the user that the particular note to which the modifier is connected to is intended to be modified upwards by a half step. The flat pitch modifier 52 indicates to the user that the particular note to which the modifier is connected to is intended to be modified downwards by a half step. Further, a natural pitch modifier 53 indicates to the user that the particular note to which the modifier is connected to is intended to cancel any previous pitch modifiers.

Any type of musical composition can be produced using the presently disclosed music notation system. It can also facilitate music performances of all kinds.

The individual pieces of the system fit together in a logical fashion. Specifically, each pitch symbol (FIG. 1) is paired with the appropriate rhythm symbol (FIG. 2), and placed in its "normal" place on a standard 5-line staff (such as a treble clef, or bass clef). In this way a 1.5 beat note could be constructed by using a quarter note rhythm symbol, followed by the notch, and then the eighth note connecting rhythm symbol. This connecting eighth note rhythmic symbol is slightly different than the regular eighth note rhythmic symbol (compare FIGS. 3 and 2). If the note is sharp or flat (FIG. 5), or requires some other instruction such as staccato, then that symbol is also placed either above or beside it, depending on the particular symbol. If no note is to be played at all, then the appropriate length rest symbol (FIG. 4) is placed on the staff. When learning the pitch symbols (FIG. 1), it is highly beneficial to see and use the mnemonics (FIG. 6) so that strong and quick associations can be created between the symbol and their meaning.

By using all the requisite symbols (items 1-5, and 7) to notate an entire musical work, and learning the mnemonics (item 6), it is much easier for a player to learn, play, or reference the work when compared to using the standard notation method. It also can increase engagement with the sheet music, and improve confidence in one's ability to learn the piece.

The if-then relationships apply to the reader, and the creator of the sheet music. For the creator, it is only that each type of note (e.g., an eighth note "G") has a particular set of symbols that must be used. Thus creating a translation from standard notation into our new notation is just one big if-then rule. "If you see X note and Y rhythm value with Z performance instruction, then replace it with P note symbol, Q rhythmic symbol and R performance symbol". Same for the reader: "If you see P note symbol and Q rhythmic symbol, then play P note for Q length of time."

All elements are necessary in order to have the power to translate any song into the new musical notation system. However, for any given song, certain symbols may or may not be necessary, simply depending on whether or not that particular song uses that type of note, or performance instruction.

There are standard spatial relationships among the symbols in our system (for instance, the rhythmic symbol is attached at the center right 3 o'clock position of the pitch symbol). However, such relationships could be changed to some degree (i.e. the rhythmic symbol could be attached at the 1 o'clock position of the pitch symbol instead), and a similar or identical meaning would most likely be interpreted by the reader. You could say the same about all the spatial relationships among the symbols. One could change them slightly, perhaps even drastically, and a person could interpret them in the same or very similar way. And obviously the order of symbols on a page can be anything that the song dictates. Further, one could slightly change the look (i.e. the weighting, shading, color, or shape) of any of the symbols and a similar or identical meaning would be interpreted.

Figure 6:
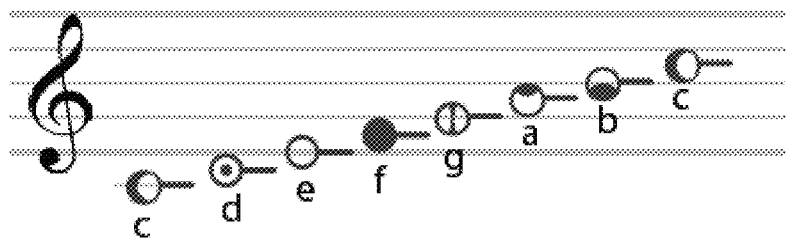
FIG. 6 shows a set of exemplary mnemonics used for each pitch symbol.

FIG. 6 shows a set of exemplary mnemonics used for each pitch symbol. The symbols for each note are designed to be used with very accessible and memorable mnemonics that even kids can learn.

Most previous systems have, for example, rhythmic symbols that are only symbols and have no spatial reinforcement of how long a user is intended to hold the note. Our symbols reflect how long you hold each note and are thus more intuitive. Other anachronisms and odd rules from the old system have been changed to be more intuitive and easier to learn. None of the exact symbols we use are meant to be limiting. Slight variations in any of the symbols could be made and a similar if not identical meaning could be drawn, as taught in this disclosure, for associating both a spatial and symbol component for the elements of the musical notation system that enables a user to more quickly grasp the meaning of the symbols.

Figure 7:
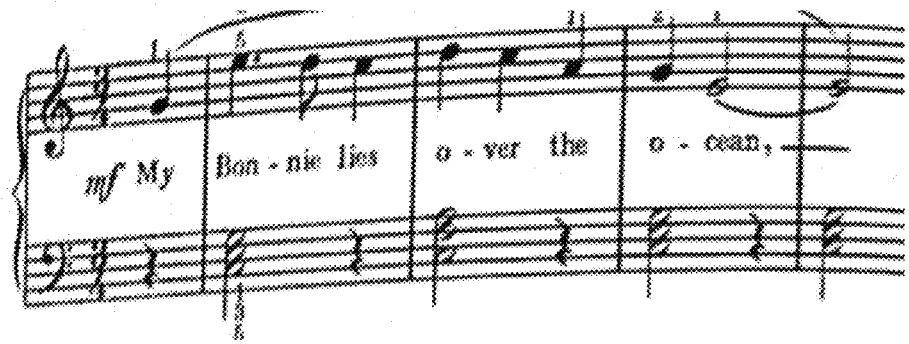
FIG. 7 shows an exemplary embodiment of the present disclosure illustrating a translation of a few measures of 'My Bonnie Lies Over The Ocean' from standard notation into the improved notation.
Figure 7:
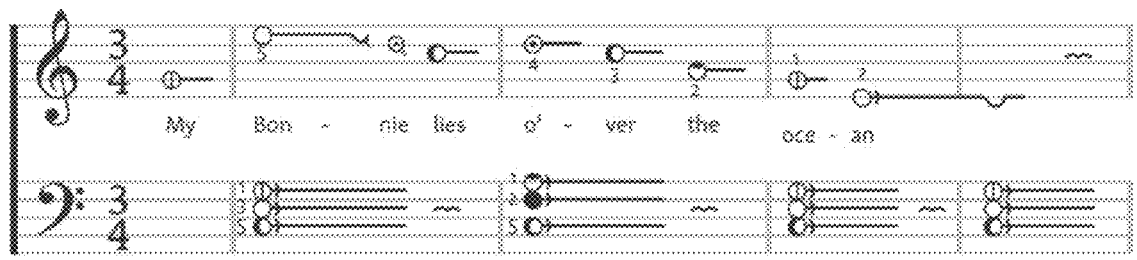

FIG. 7 shows an exemplary embodiment of the present disclosure illustrating a translation of a few measures of 'My Bonnie Lies Over The Ocean' from a previous notation into the improved musical notation system. To use it, someone simply reads through our version of sheet music, rather than using traditional sheet music; and it will very likely be much easier to read. Specifically, from the beginning of FIG. 7, a reader could look at the treble clef, and see the first symbol, which has a vertical line in the middle of the circle. They'd think, "Groove for G", and know it's a G. They'd see the note just has a short horizontal line attached, and know it's quarter note. Moving onto the first full measure, they'd see an empty circle in the treble clef, and think, 'E for empty". Just after that, they'd see the second note with a dot, and think "D for Dot", and right after that, they'd see the crescent moon shape, and think "C looks like 'C'", and know it's a C. While in the bass clef, they'd see the same crescent moon shaped note, and realize it's the same as before. "C looks like 'C'". Next, they'd see an empty circle, and remember that means "E", and then the vertical line again, and remember "Groove for G". It would also be obvious how long the left hand notes should get held compared with the right hand notes, because the horizontal lines make this easy to see. They could continue on through the whole song like this. The simple mnemonics are all they need to know for both clefs. And gauging rhythm will be an intuitive process as well. After some practice with the system, the symbols would become second nature, like reading in general.

Compare this to the standard system. The opening treble clef symbols, one could remember either "Every Good Boy Does Fine" is for the lines, going from bottom to top (not top to bottom, and not for the spaces), or "FACE" is for the spaces going from bottom to top. So they might recognize the first line as "E", and then have to count 2 spaces to get to the first note, and then think "E . . . F . . . G. G!" and then they'd know the first note is G. After this, they might continue with their line mnemonic, and count up 4 lines to find that D is the closest line, but still not the note they want, and so have to count up one from there, and see that the first full measure starts with an "E". Now for the left hand, bass cleff part; they'd have to remember a separate set of mnemonics, "Great Big Dogs Fight Animals" for the lines, from bottom to top, or "All Cows Eat Grass" for the spaces. They could pick one of these, and try to count up to figure out each note, which would be another process fraught with error. At no point till after they've figured out the notes would it be obvious that two of the left hand notes are actually the same as notes they've already played in their right hand. Also the fact that the left hand notes aren't filled in does not intuitively tell the reader that those notes are longer than the right hand notes being played. It is yet another arbitrary rule for them to remember and follow. They could continue on like this through the piece, if they don't first just get discouraged and give up. Additionally: Either a human or a machine could write or read the presently disclosed system of music notation. Also, any type of musical composition can be produced using our music notation system. It can also facilitate music performances of all kinds.

Figure 8:
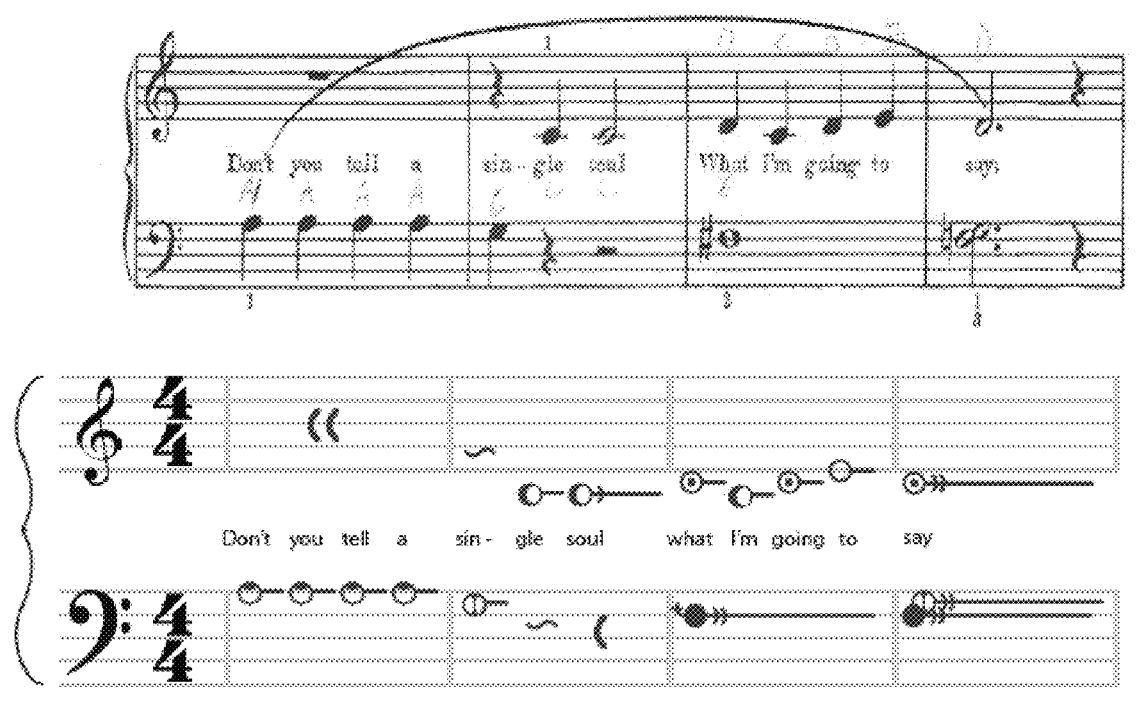

FIG. 8 shows another exemplary embodiment of the present disclosure illustrating a translation of an excerpt of music from the standard notation into the new notation of the present disclosure.

Figure 9:
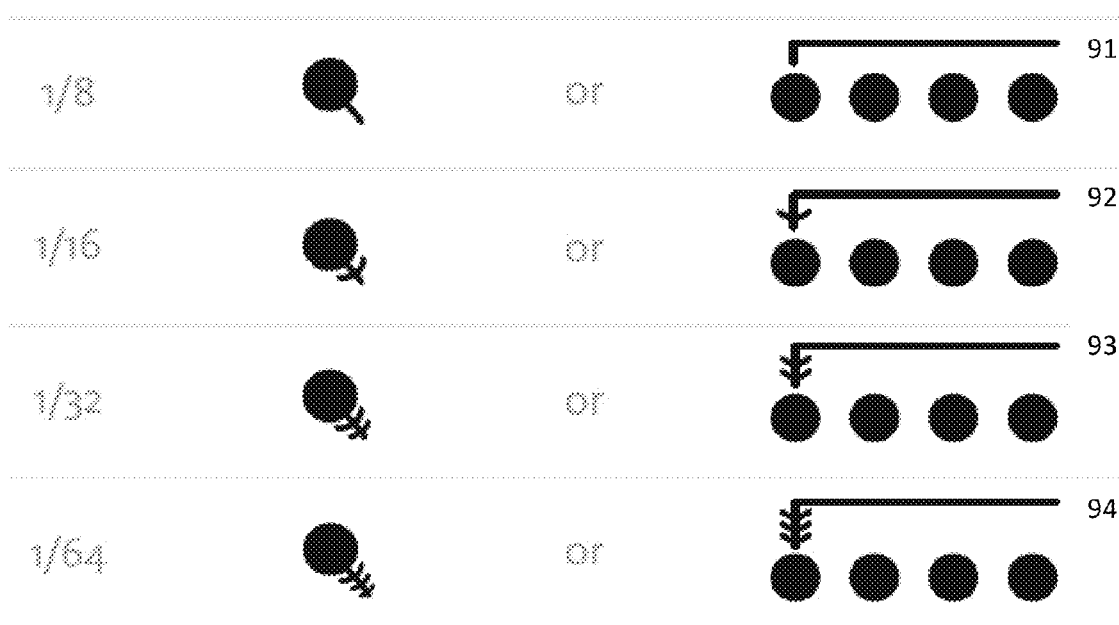
FIG. 9 shows an exemplary embodiment of the present disclosure illustrating the beaming of symbols.

FIG. 9 shows an exemplary embodiment of the present disclosure illustrating the beaming of symbols. Beaming allows a music composition containing many similar notes to be cleaned up visually. For example, if a passage contained numerous sixteenth notes consecutively, instead of displaying each separate sixteenth note individually, it is possible to "beam" them together with a line that stretches for the duration of the passage. A single rhythm symbol is presented at the start of the beam to indicate to the user that all subsequent notes in this beam are of the stated rhythmic value. Beams are only created for groups when their rhythmic values are an eighth note or shorter. An eighth note beam 91, sixteenth note beam 92, thirty second note beam 93, and sixty-fourth note beam 94 are all presented as horizontal lines spanning the duration of the passage and displayed with an increasing number of horizontally oriented curves to indicate shorter note durations.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

The detailed description set forth below in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Further, although exemplary devices and schematics implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. A musical notation system, comprising:
    a plurality of notes presentable on a staff, wherein each of the plurality of notes comprises a pitch component and a rhythm component,
    wherein the pitch component of each note includes a pitch spatial component and a pitch symbol component, and further wherein each of the plurality of notes are separated from each other in a musical scale by a full step;
    wherein the rhythm component of each note includes a rhythm spatial component and a rhythm symbol component;
    a pitch modifier connectable to one of the plurality of notes, wherein a pitch of the notes to which the pitch modifier is connected to is modified by a half step.

2. The musical notation system of claim 1, further comprising:
    a notch for connecting at least two of rhythm components together to create a notched symbol.

3. The musical notation system of claim 2, wherein the notched symbol is presented with a single pitch symbol component.

4. The musical notation system of claim 1, further comprising:
    a plurality of rest symbols.

* * * * *